United States Patent
Shen

(10) Patent No.: US 12,401,225 B2
(45) Date of Patent: Aug. 26, 2025

(54) ULTRA-HIGH-VOLTAGE LINE ENERGY HARVESTING POWER SUPPLY AND SYSTEM

(71) Applicant: SUZHOU KANGKAI ELECTRIC CO., LTD., Jiangsu (CN)

(72) Inventor: Yongfu Shen, Jiangsu (CN)

(73) Assignee: SUZHOU KANGKAI ELECTRIC CO., LTD., Jiangsu (CN)

( * ) Notice: Subject to any disclaimer, the term of this patent is extended or adjusted under 35 U.S.C. 154(b) by 310 days.

(21) Appl. No.: 18/018,700

(22) PCT Filed: Dec. 30, 2020

(86) PCT No.: PCT/CN2020/141308
§ 371 (c)(1),
(2) Date: Jan. 30, 2023

(87) PCT Pub. No.: WO2022/021792
PCT Pub. Date: Feb. 3, 2022

(65) Prior Publication Data
US 2023/0307949 A1   Sep. 28, 2023

(30) Foreign Application Priority Data

Jul. 30, 2020  (CN) .......................... 202010751638.4

(51) Int. Cl.
*H02J 50/10*    (2016.01)
(52) U.S. Cl.
CPC .................................... *H02J 50/10* (2016.02)
(58) Field of Classification Search
CPC ...... H02J 50/00; H02J 1/00; H02J 3/00; H02J 4/00; H02J 5/00; H02J 11/00; H02J 2300/00; H04B 5/00
See application file for complete search history.

(56) References Cited

U.S. PATENT DOCUMENTS

2017/0077799 A1   3/2017 Wang et al.
2020/0028351 A1*  1/2020 Agliata ................. H02J 50/001
(Continued)

FOREIGN PATENT DOCUMENTS

CN    105024460 A    11/2015
CN    110829619 A     2/2020
(Continued)

OTHER PUBLICATIONS

International Search Report for PCT /CN2020/141308, mailed on Apr. 28, 2021.

*Primary Examiner* — Rexford N Barnie
*Assistant Examiner* — Joseph N Inge
(74) *Attorney, Agent, or Firm* — Schmeiser, Olsen & Watts LLP

(57) ABSTRACT

An ultra-high-voltage line energy harvesting power supply and system is provided. The power supply includes an energy harvesting unit that acquires electric energy from an ultra-high-voltage line and converts the electric energy into a stable DC power supply output, an energy supply unit that converts the stable DC power supply into a load AC/DC power supply and supplies the load AC/DC power supply to an energy supply unit of a load and an equipotential connection line, wherein two ends of the equipotential connection line are respectively connected to the ultra-high-voltage line and an output end of the energy supply unit. The energy harvesting unit includes an energy harvesting device for acquiring electric energy from the ultra-high-voltage line, and an AC/DC energy harvesting management circuit for converting the electric energy acquired by the energy harvesting device into a stable DC power supply and outputting the stable DC power supply.

8 Claims, 1 Drawing Sheet

(56) References Cited

U.S. PATENT DOCUMENTS

2020/0052488 A1\* 2/2020 Desmarais .............. H01F 38/28
2020/0251927 A1\* 8/2020 Coats ....................... H02J 11/00

FOREIGN PATENT DOCUMENTS

| CN | 111130152 A | 5/2020 |
| CN | 111799893 A | 10/2020 |
| CN | 212277994 A | 1/2021 |

\* cited by examiner

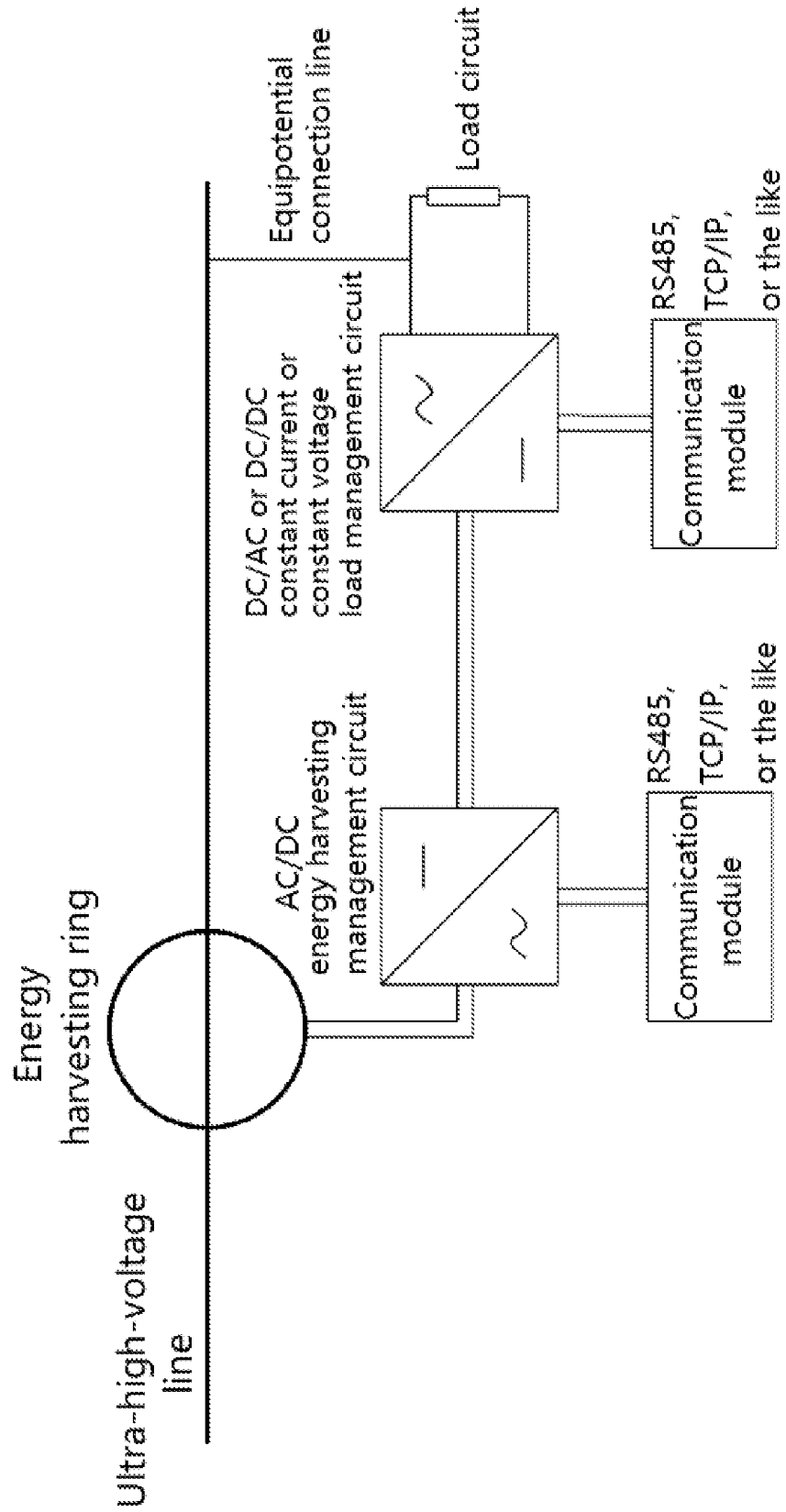

ULTRA-HIGH-VOLTAGE LINE ENERGY HARVESTING POWER SUPPLY AND SYSTEM

CROSS-REFERENCE TO RELATED APPLICATIONS

This application claims priority to PCT Application No. PCT/CN2020/141308, having a filing date of Dec. 30, 2020, which claims priority to CN Application No. 202010751638.4, having a filing date of Jul. 30, 2020, the entire contents both of which are hereby incorporated by reference.

FIELD OF TECHNOLOGY

The following relates to the field of power supply technology, and in particular, relates to a power supply and system which can directly acquire energy from an ultra-high-voltage line.

BACKGROUND

On Jun. 25, 2020, the successful networking of Zhangbei 500 kV Flexible DC Power Grid Test Demonstration Project means that the DC Ultra High Voltage networking technology tends to be mature, and the large-scale networking of DC UHV lines is about to begin. Followed by DC 800 kV and DC 1100 kV UHV power grid networking is about to advance. According to the technical requirements of DC 800 kV and DC 1100 kV UHV power grids, UHV equipment has higher and higher requirements for insulation withstand voltage stress of power supply equipment. The traditional isolation power supply has been unable to meet the requirements of insulation withstand voltage stress of UHV equipment, which will become a constraint to the progress of networking technology of DC 800 kV and DC 1100 kV UHV power grids. Therefore, in order to meet the requirements of insulation withstand voltage stress of power supply equipment and improve the operational reliability of UHV DC grid, it is necessary to design a new power supply device.

SUMMARY

An aspect relates to an ultra-high-voltage line energy harvesting power supply with high insulation withstand voltage and high reliability, and especially suitable for supplying energy to ultra-high-voltage equipment in direct-current ultra-high-voltage flexible networking.

To achieve the above aspect, a technical solution employed by the present disclosure is:

An ultra-high-voltage line energy harvesting power supply, configured for supplying electric energy to a load, comprises an energy harvesting unit for acquiring electric energy from an ultra-high-voltage line, converting the electric energy to a stable DC power supply and outputting thereof, an energy supply unit for converting the stable DC power supply to a load AC/DC power supply and supplying the load AC/DC power supply to a load, and an equipotential connection line, wherein an input end of the energy harvesting unit is connected to the ultra-high-voltage line, an output end of the energy harvesting unit is connected to an input end of the energy supply unit, two ends of the equipotential connection line are respectively connected to the ultra-high-voltage line and an output end of the energy supply unit, and the load is connected to the output end of the energy supply unit.

The energy harvesting unit comprises an energy harvesting device for acquiring electric energy from the ultra-high-voltage line, and an AC/DC energy harvesting management circuit for converting the electric energy acquired by the energy harvesting device to a stable DC power supply and outputting the stable DC power supply.

The energy harvesting device comprises an energy harvesting ring for converting a magnetic field generated during the transmission of current on the ultra-high-voltage line to electrical energy.

The energy harvesting ring is arranged on the ultra-high-voltage line.

The AC/DC energy harvesting management circuit comprises an AC/DC conversion module that constitutes an energy harvesting loop, a sampling module for acquiring magnitude of the current on the ultra-high-voltage line and outputting a corresponding sampling signal, and an adjustment module for adjusting impedance of the energy harvesting loop based on the sampling signal.

The energy supply unit comprises a DC/AC constant current or constant voltage load management circuit for converting the stable DC power supply to a load AC power supply and providing it to the load, or the energy supply unit comprises a DC/DC constant current or constant voltage load management circuit for converting the stable DC power supply to a load DC power supply and providing it to the load.

The ultra-high-voltage line energy harvesting power supply further comprises a communication module for enabling communication between the AC/DC energy harvesting management circuit, the DC/AC constant current or constant voltage load management circuit, or the DC/DC constant current or constant voltage load management circuit and a management side.

The communication module is a RS485 or TCP/IP module.

The present disclosure still provides an ultra-high-voltage line energy harvesting system based on the aforementioned ultra-high-voltage line energy harvesting power supply, the solution thereof is:

An ultra-high-voltage line energy harvesting system comprises the aforementioned ultra-high-voltage line energy harvesting power supply and a management side. The management side is an information management platform of an ultra-high-voltage grid.

Due to use of the above technical solutions, the present disclosure has the following advantages:

The present disclosure can directly acquire energy from the ultra-high-voltage line, have advantages of high insulation withstand voltage stress, stable and reliable operation, and is suitable for supplying energy to ultra-high-voltage equipment in direct-current ultra-high-voltage flexible networking.

BRIEF DESCRIPTION

Some of the embodiments will be described in detail, with references to the following FIGURES, wherein like designations denote like members, wherein:

FIG. 1 shows a principle diagram of an ultra-high-voltage line energy harvesting power supply of the present disclosure.

DETAILED DESCRIPTION

The present disclosure is further described below combining with embodiments shown in the accompanying drawings.

As shown in FIG. 1, an ultra-high-voltage line energy harvesting power supply comprises an energy harvesting unit, an energy supply unit and an equipotential connection line. An input end of the energy harvesting unit is connected to an ultra-high-voltage line, an output end of the energy harvesting unit is connected to an input end of the energy supply unit, and a load is connected to an output end of the energy supply unit, such that the ultra-high-voltage line energy harvesting power supply can supply electric energy to the load.

The energy harvesting unit is configured for acquiring electric energy from an ultra-high-voltage line, converting the electric energy to a stable DC power supply and outputting thereof. The energy harvesting unit comprises an energy harvesting device and an AC/DC energy harvesting management circuit. The energy harvesting device is configured for acquiring electric energy from the ultra-high-voltage line, and since the ultra-high-voltage line would generate a magnetic field in the space near it when transmitting current, the energy harvesting device could adopt an energy harvesting ring for converting the magnetic field generated during the transmission of current on the ultra-high-voltage line to electrical energy, and the energy harvesting ring is arranged on the ultra-high-voltage line. The AC/DC energy harvesting management circuit is configured for converting the electric energy acquired by the energy harvesting device to a stable DC power supply and outputting the stable DC power supply. Since randomness of the current transmitted on the ultra-high-voltage line varies greatly, in order to obtain a relatively stable power supply, it is necessary to configure the AC/DC energy harvesting management circuit, and the AC/DC energy harvesting management circuit adjusts the impedance of an energy harvesting loop based on the magnitude of the current on the ultra-high-voltage line, so that the harvested voltage is relatively stable; therefore, the AC/DC energy harvesting management circuit comprises an AC/DC conversion module that constitutes an energy harvesting loop, a sampling module for acquiring the magnitude of the current on the ultra-high-voltage line and outputting a corresponding sampling signal, and an adjustment module for adjusting the impedance of the energy harvesting loop based on the sampling signal.

The energy supply unit is configured for converting the stable DC power supply to a load AC/DC power supply and providing it to the load (such as the ultra-high-voltage equipment). The energy supply unit comprises a DC/AC constant current or constant voltage load management circuit for converting the stable DC power supply output from the energy harvesting unit to a load AC power supply and providing it to the load, or the energy supply unit comprises a DC/DC constant current or constant voltage load management circuit for converting the stable DC power supply output from the energy harvesting unit to a load DC power supply and providing it to the load. The aforementioned DC/AC or DC/DC constant current or constant voltage load management circuit can further improve the energy conversion efficiency, which maintains the highest energy conversion efficiency, thereby maintaining stable load operation. Two ends of the equipotential connection line are respectively connected to the ultra-high-voltage line and an output end of the energy supply unit, so that the harvested energy is equipotentially connected to the ultra-high-voltage line, so the withstand voltage stress of the power supply is equal to that of the ultra-high-voltage line.

The ultra-high-voltage line energy harvesting power supply further comprises a communication module for enabling communication between the AC/DC energy harvesting management circuit, the DC/AC constant current or constant voltage load management circuit, or the DC/DC constant current or constant voltage load management circuit and a management side, concretely the communication between the AC/DC energy harvesting management circuit and a management side, the communication between the DC/AC constant current load management circuit and a management side, the communication between the DC/AC constant voltage load management circuit and a management side, the communication between the DC/DC constant current load management circuit and a management side, and the communication between the DC/DC constant voltage load management circuit and a management side; so that the energy harvesting management circuit and the load management circuit (including the DC/AC constant current or constant voltage load management circuit, the DC/DC constant current or constant voltage load management circuit) can return a load working condition of the ultra-high-voltage side to the management side through the communication module, and can also manage the load through the management side. The communication module can be set up in two parts, which are connected to the energy harvesting management circuit and the load management circuit respectively. The communication module may adopt a RS485 or TCP/IP module, and the like.

Based on the above ultra-high-voltage line energy harvesting power supply, an ultra-high-voltage line energy harvesting system can be constructed, and the ultra-high-voltage line energy harvesting system comprises the above ultra-high-voltage line energy harvesting power supply configured with the communication module and a management side that can communicate with it, wherein the management side is an information management platform of an ultra-high-voltage grid.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. An ultra-high-voltage line energy harvesting power supply, configured for supplying electric energy to a load, wherein the ultra-high-voltage line energy harvesting power supply comprises:
    an energy harvesting unit configured to acquire electric energy from an ultra-high-voltage line with a voltage level equal to or greater than 500 kV, converting the electric energy to a stable DC power supply and outputting thereof, wherein the energy harvesting unit comprises an energy harvesting device configured to acquire electric energy from the ultra-high-voltage line, and an AC/DC energy harvesting management circuit configured to convert the electric energy acquired by the energy harvesting device to a stable DC power supply and outputting the stable DC power supply, further wherein the AC/DC energy harvesting management circuit comprises an AC/DC conversion module that constitutes an energy harvesting loop, a sampling module configured to acquire magnitude of the current on the ultra-high-voltage line and outputting a corresponding sampling signal, and an adjustment module configured to adjust impedance of the energy harvesting loop based on the sampling signal;

an energy supply unit configured to convert the stable DC power supply to a load AC/DC power supply and supplying the load AC/DC power supply to the load; and an equipotential connection line, wherein an input end of the energy harvesting unit is connected to the ultra-high-voltage line, an output end of the energy harvesting unit is connected to an input end of the energy supply unit, two ends of the equipotential connection line are respectively connected to the ultra-high-voltage line and an output end of the energy supply unit, and the load is connected to the output end of the energy supply unit.

2. The ultra-high-voltage line energy harvesting power supply according to claim 1, wherein the energy harvesting ring is configured to convert a magnetic field generated during transmission of current on the ultra-high-voltage line to electrical energy.

3. The ultra-high-voltage line energy harvesting power supply according to claim 2, wherein the energy harvesting ring is arranged on the ultra-high-voltage line.

4. The ultra-high-voltage line energy harvesting power supply according to claim 1, wherein the energy supply unit comprises a DC/AC constant current or constant voltage load management circuit configured to convert the stable DC power supply to a load AC power supply and providing it to the load, or the energy supply unit comprises a DC/DC constant current or constant voltage load management circuit configured to convert the stable DC power supply to a load DC power supply and providing it to the load.

5. The ultra-high-voltage line energy harvesting power supply according to claim 4, wherein the ultra-high-voltage line energy harvesting power supply further comprising a communication module configured to enable communication between the AC/DC energy harvesting management circuit, the DC/AC constant current or constant voltage load management circuit, or the DC/DC constant current or constant voltage load management circuit and a management side.

6. The ultra-high-voltage line energy harvesting power supply according to claim 5, wherein the communication module is a RS485 or TCP/IP module.

7. The ultra-high-voltage line energy harvesting system, wherein the ultra-high-voltage line energy harvesting system comprises an ultra-high-voltage line energy harvesting power supply according to claim 5 and a management side.

8. The ultra-high-voltage line energy harvesting system according to claim 7, wherein the management side is an information management platform of ultra-high-voltage grid.

* * * * *